(12) United States Patent
Hiwatashi et al.

(10) Patent No.: US 10,220,838 B2
(45) Date of Patent: Mar. 5, 2019

(54) VEHICLE CONTROL DEVICE

(71) Applicant: MAZDA MOTOR CORPORATION, Hiroshima (JP)

(72) Inventors: Keiichi Hiwatashi, Higashihiroshima (JP); Daisuke Umetsu, Hiroshima (JP); Osamu Sunahara, Hiroshima (JP); Koichi Kimoto, Hiroshima (JP); Yasunori Takahara, Hiroshima (JP); Daisaku Ogawa, Hiroshima (JP); Chikako Ohisa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/763,696

(22) PCT Filed: Dec. 22, 2016

(86) PCT No.: PCT/JP2016/088500
§ 371 (c)(1),
(2) Date: Mar. 27, 2018

(87) PCT Pub. No.: WO2017/111089
PCT Pub. Date: Jun. 29, 2017

(65) Prior Publication Data
US 2018/0281780 A1    Oct. 4, 2018

(30) Foreign Application Priority Data

Dec. 22, 2015    (JP) ................................. 2015-250085
Sep. 9, 2016    (JP) ................................. 2016-176479

(51) Int. Cl.
*B60W 30/045*    (2012.01)
*B60W 40/114*    (2012.01)
(Continued)

(52) U.S. Cl.
CPC ........ *B60W 30/045* (2013.01); *B60W 40/114* (2013.01); *B62D 6/00* (2013.01);
(Continued)

(58) Field of Classification Search
CPC ..... B60W 30/045; B60W 40/114; B62D 6/00; B62D 6/003; F02D 17/02
(Continued)

(56) References Cited

U.S. PATENT DOCUMENTS

2018/0066625 A1* 3/2018 Hiwatashi ................ F01N 3/10
2018/0265119 A1* 9/2018 Ogawa ................ B62D 5/0463

FOREIGN PATENT DOCUMENTS

JP    2014-166014 A    9/2014

OTHER PUBLICATIONS

International Search Report issued in PCT/JP2016/088500; dated Apr. 4, 2017.
(Continued)

*Primary Examiner* — Yazan A Soofi
(74) *Attorney, Agent, or Firm* — Studebaker & Brackett PC

(57) ABSTRACT

Disclosed is a vehicle control device which is applied to a vehicle equipped with an engine (10) and an engine torque adjustment mechanism for adjusting an engine torque. The control device comprises a PCM (50) configured, upon satisfaction of a condition that the vehicle is traveling and a steering angle-related value relevant to a steering angle of a steering device is increasing, to control the engine torque adjustment mechanism to reduce the engine torque, so as to execute a vehicle attitude control for generating vehicle deceleration. The PCM (50) is configured, upon satisfaction of a vehicle attitude control-terminating condition for terminating the vehicle attitude control, to control the engine torque adjustment mechanism to restore the engine torque to
(Continued)

an original level of torque before the execution of the vehicle attitude control. The PCM (50) is further configured to gradually ease the vehicle attitude control-terminating condition, as the number of times of combustion per unit time in the engine (10) becomes smaller.

8 Claims, 8 Drawing Sheets

(51) Int. Cl.
*B62D 6/00* (2006.01)
*F02D 17/02* (2006.01)

(52) U.S. Cl.
CPC ............. *B62D 6/003* (2013.01); *F02D 17/02* (2013.01); *B60W 2540/10* (2013.01); *B60W 2710/0666* (2013.01); *B60W 2710/105* (2013.01)

(58) Field of Classification Search
USPC .......................................................... 701/38
See application file for complete search history.

(56) References Cited

OTHER PUBLICATIONS

International Preliminary Report on Patentability and Written Opinion issued in PCT/JP2016/088500; dated Jun. 26, 2018.

\* cited by examiner

FIG.6
(a)
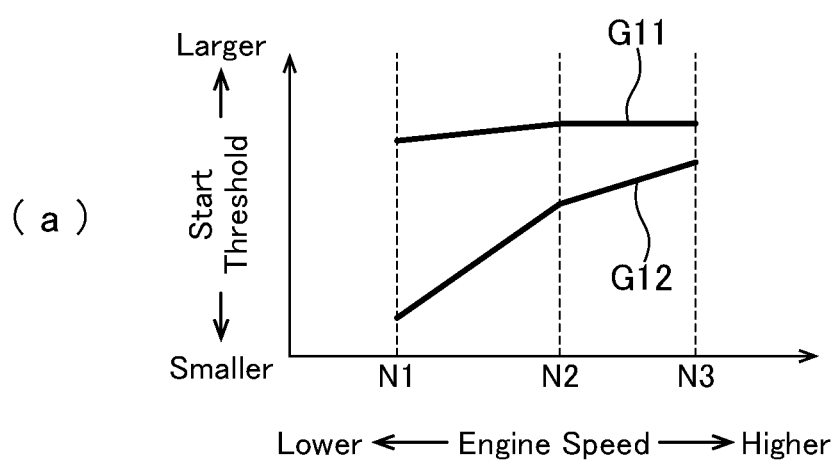
(b)
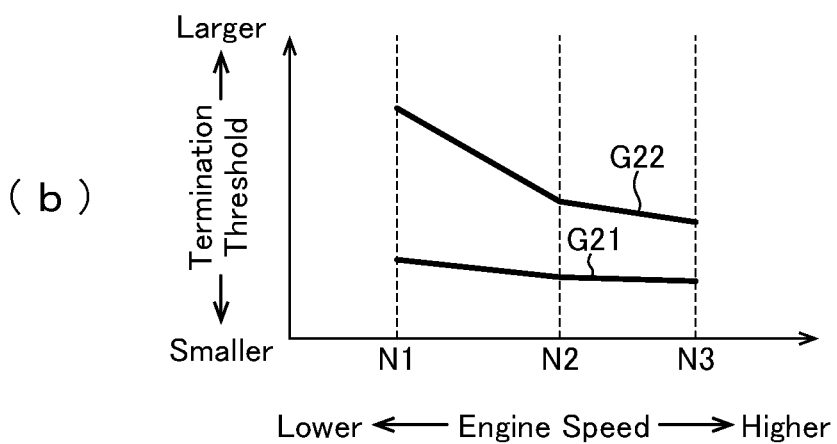

VEHICLE CONTROL DEVICE

TECHNICAL FIELD

The present invention relates to a vehicle control device, and more particularly to a vehicle control device for performing engine control to realize a desired vehicle attitude (vehicle behavior).

BACKGROUND ART

Heretofore, there has been known a control device capable of, in a situation where the behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such behavior.

There has also been known a vehicle motion control device operable to adjust a degree of deceleration during vehicle cornering to thereby adjust a load to be applied to front road wheels as steerable road wheels so as to enable a series of manipulations (braking, turning of a steering wheel, accelerating, turning-back of the steering wheel, etc.) by a driver during vehicle cornering under a normal traveling condition to be performed naturally and stably, differently from the aforementioned control for improving safety in a traveling condition causing the vehicle behavior to become unstable.

Further, there has been proposed a vehicle behavior control device operable to reduce a vehicle driving force according to a yaw rate-related quantity (e.g., yaw acceleration) corresponding to steering wheel manipulation by a driver, thereby making it possible to quickly generate vehicle deceleration in response to start of the steering wheel manipulation by the driver and thus quickly apply a sufficient load to front road wheels as steerable road wheels (see, for example, the following Patent Document 1). In this vehicle behavior control device, in response to start of the steering wheel manipulation, a load is quickly applied to the front road wheels to cause an increase in frictional force between each of the front road wheels and a road surface and thus an increase in cornering force of the front road wheels, thereby providing an improved turn-in ability of a vehicle in an initial phase after entering a curve, and an improved responsivity with respect to turning manipulation of a steering wheel (i.e., steering stability). This makes it possible to realize vehicle behavior just as intended by the driver.

CITATION LIST

[Patent Document]
Patent Document 1: Japanese Patent Laid-Open No. 2014-166014A

SUMMARY OF INVENTION

Technical Problem

In the field of multi-cylinder internal combustion engines (i.e., internal combustion engines of a type having a plurality of cylinders), with a view to improving fuel economy, there has been known a technique of switching an operation mode of the engine between an all-cylinder operation mode in which combustion of an air-fuel mixture is performed in all of the plurality of cylinders and a reduced-cylinder operation mode in which combustion of an air-fuel mixture is stopped in a part of the plurality of cylinders (a part of the plurality of cylinders is deactivated), according to a driving state of a vehicle equipped with the engine. When such a cylinder deactivatable engine is operated in the reduced-cylinder operation mode, combustion is prohibited in at least two of the plurality of cylinders which are mutually non-consecutive in terms of a combustion order (firing order), and is sequentially performed in the remaining cylinders. Therefore, a combustion interval in the reduced-cylinder operation mode becomes longer as compared to that during the all-cylinder operation.

Thus, in the case where the variable cylinder engine employs the vehicle behavior control device described in the Patent Document 1, and performs control (vehicle attitude control) of reducing an engine torque so as to generate vehicle deceleration according to manipulation of a steering wheel by a driver, a difference can occur between the all-cylinder operation mode and the reduced-cylinder operation mode, in terms of a time period after issuing a demand for terminating this control through until a combustion timing first comes in one of the cylinders and the vehicle attitude control is actually terminated. As a result, when the engine operation mode is switched between the all-cylinder operation mode and the reduced-cylinder operation mode, a difference is likely to occur in terms of timings, such as a timing at which a cornering force of front road wheels is reduced in response to the restoration of the engine torque, and a timing at which a reaction force to a steering wheel is reduced in response to the reduction of the cornering force, thereby leading to a situation where the vehicle behavior becomes different between the two modes, and the switching gives a driver an uncomfortable feeling.

As above, the problem has been described that the responsiveness of torque restoration (which means restoring the engine torque to an original level of torque before execution of the vehicle attitude control) with respect to a demand for termination of the vehicle attitude control is deteriorated during operation of the cylinder deactivatable engine in the reduced-cylinder operation mode. Such a problem tends to occur not only during operation of the cylinder deactivatable engine in the reduced-cylinder operation mode, but also during operation of the cylinder deactivatable engine under the condition that the number of times of combustion per unit time in the engine is relatively small (e.g., in a low engine speed range).

The present invention has been made in view of solving the conventional problem, and an object thereof is to provide a vehicle control device capable of easing a condition for termination of a vehicle attitude control, depending on the number of times of combustion per unit time in an engine, to thereby adequately suppress deterioration in responsiveness of torque restoration in a terminating stage of the vehicle attitude control.

Solution to Technical Problem

In order to achieve the above object, according to a first aspect on the present invention, there is provided a vehicle control device which is applied to a vehicle equipped with an engine, and an engine torque adjustment mechanism for adjusting an output torque of the engine. The vehicle control device includes: a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control; and a condition easing part configured to gradually ease the vehicle attitude control-terminating condition, as the number of times of combustion per unit time in the engine becomes smaller.

In the vehicle control device according to the first aspect of the present invention, when the number of times of combustion per unit time in the engine is relatively small, the vehicle attitude control-terminating condition is relatively largely eased, so that a timing at which a demand for terminating the reduction of engine torque is issued according to steering becomes earlier than when the number of times of combustion per unit time in the engine is relatively large. This makes it possible to suppress delay in termination of the vehicle attitude control.

Therefore, in the vehicle control device according to the first aspect of the present invention, it is possible to adequately suppress deterioration in responsiveness of torque restoration in a terminating stage of the vehicle attitude control, in the engine operation state in which the number of times of combustion per unit time in the engine is relatively small. As a result, it is possible to prevent delay in timings, such as a timing at which a cornering force of front road wheels is reduced in response to the restoration of the engine torque, and a timing at which a reaction force to a steering wheel is reduced in response to the reduction of the cornering force.

In one example, as with the condition for executing the vehicle attitude control (vehicle attitude control-starting condition), the vehicle attitude control-terminating condition may also be defined based on the steering angle-related value. In this example, a condition that the steering angle-related value is decreasing may be used as the vehicle attitude control-terminating condition.

In the vehicle control device according to the first aspect of the present invention, the engine comprises a plurality of cylinders, and is capable of being operated in a reduced-cylinder operation mode in which combustion in a part of the plurality of cylinders is ceased, and the condition easing part is configured to gradually ease the vehicle attitude control-terminating condition, as the number of cylinders in which combustion is ceased, among the plurality of cylinders, becomes larger.

According to this feature, it is possible to estimate the number of times of combustion per unit time in the engine, based on the number of cylinders deactivated in the reduced-cylinder operation mode (deactivated cylinders), to adequately perform easing of the vehicle attitude control-terminating condition according to the number of the deactivated cylinders.

Preferably, in the vehicle control device according to the first aspect of the present invention, the vehicle is further equipped with an engine speed sensor configured to detect an engine speed of the engine, and the condition easing part is configured to gradually ease the vehicle attitude control-terminating condition, as the engine speed becomes lower.

According to this feature, it is possible to estimate the number of times of combustion per unit time in the engine, based on a current value of the engine speed, to adequately perform easing of the vehicle attitude control-terminating condition.

Preferably, in the vehicle control device according to the first aspect of the present invention, the vehicle attitude control part is configured to control the engine torque adjustment mechanism such that a change rate of the output torque in a restoration direction becomes larger, as the number of times of combustion per unit time becomes smaller.

According to this feature, when the number of times of combustion per unit time in the engine is relatively small, the rate of change of the engine torque in the restoration direction is set to a relatively large value, so that it is possible to quickly increase the engine torque in the terminating stage of the vehicle attitude control. Therefore, according to this feature, it is possible to more effectively suppress the deterioration in responsiveness of torque restoration in the terminating stage of the vehicle attitude control, in the engine operation state in which the number of times of combustion per unit time in the engine is relatively small.

Preferably, in the vehicle control device according to the first aspect of the present invention, the vehicle attitude control part is configured to control the engine torque adjustment mechanism such that an increase amount per unit time of the output torque at the time of a restoration becomes larger, as the number of times of combustion per unit time becomes smaller.

According to this feature, in the engine operation state in which the number of times of combustion per unit time in the engine is relatively small, it is also possible to quickly restore the engine torque in the termination stage of the vehicle attitude control, and more effectively suppress the deterioration in responsiveness of torque restoration in the terminating stage of the vehicle attitude control.

Preferably, in the vehicle control device according to the first aspect of the present invention, the vehicle is further equipped with a steering angle sensor configured to detect the steering angle of the steering device, the vehicle attitude control part uses, as the vehicle attitude control-terminating condition, such a condition that a change rate of the steering angle detected by the steering angle sensor is less than a given speed, and the condition easing part is configured to ease the vehicle attitude control-terminating condition by increasing the given speed.

In order to achieve the above object, according to a second aspect on the present invention, there is provided a vehicle control device which is applied to a vehicle equipped with an engine, and an engine torque adjustment mechanism for adjusting an output torque of the engine. The vehicle control device includes: a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control; and a condition easing part configured, when the number of times of combustion per unit time in the engine is a first value, to ease the vehicle attitude control-terminating condition more largely than when the number of times of combustion per unit time in the engine is a second value greater than the first value.

In the vehicle control device according to the second aspect of the present invention, it is also possible to adequately suppress the deterioration in responsiveness of torque restoration in the terminating stage of the vehicle attitude control, in the engine operation state in which the number of times of combustion per unit time in the engine is relatively small.

In order to achieve the above object, according to a third aspect on the present invention, there is provided a vehicle control device which is applied to a vehicle equipped with an engine, and an engine torque adjustment mechanism for adjusting an output torque of the engine. The vehicle control device includes: a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control, wherein the engine comprises a plurality of cylinders, and is switchable between a reduced-cylinder operation mode in which combustion in a part of the plurality of cylinders is ceased, and an all-cylinder operation mode in which combustion is performed in all of the plurality of cylinders, and wherein the control device further comprises a condition easing part configured, when the engine is operated in the reduced-cylinder operation mode, to ease the vehicle attitude control-terminating condition more largely than when the engine is operated in the all-cylinder operation mode.

In the vehicle control device according to the third aspect of the present invention, it is possible to adequately suppress the deterioration in responsiveness of torque restoration in the terminating stage of the vehicle attitude control, in the reduced-cylinder operation mode.

Effect of Invention

The vehicle control device of the present invention is capable of easing the vehicle attitude control-terminating condition depending on the number of times of combustion per unit time in the engine, to thereby adequately suppress deterioration in responsiveness of torque restoration in the terminating stage of the vehicle attitude control.

BRIEF DESCRIPTION OF DRAWINGS

FIGS. 6(a) and 6(b) are maps defining a vehicle attitude control start threshold and a vehicle attitude control termination threshold in the engine control processing routine to be executed by the vehicle control device according to this embodiment.

DESCRIPTION OF EMBODIMENTS

With reference to the accompanying drawings, a vehicle control device according to one embodiment of the present invention will now be described.

<System Configuration>

Figure 1:
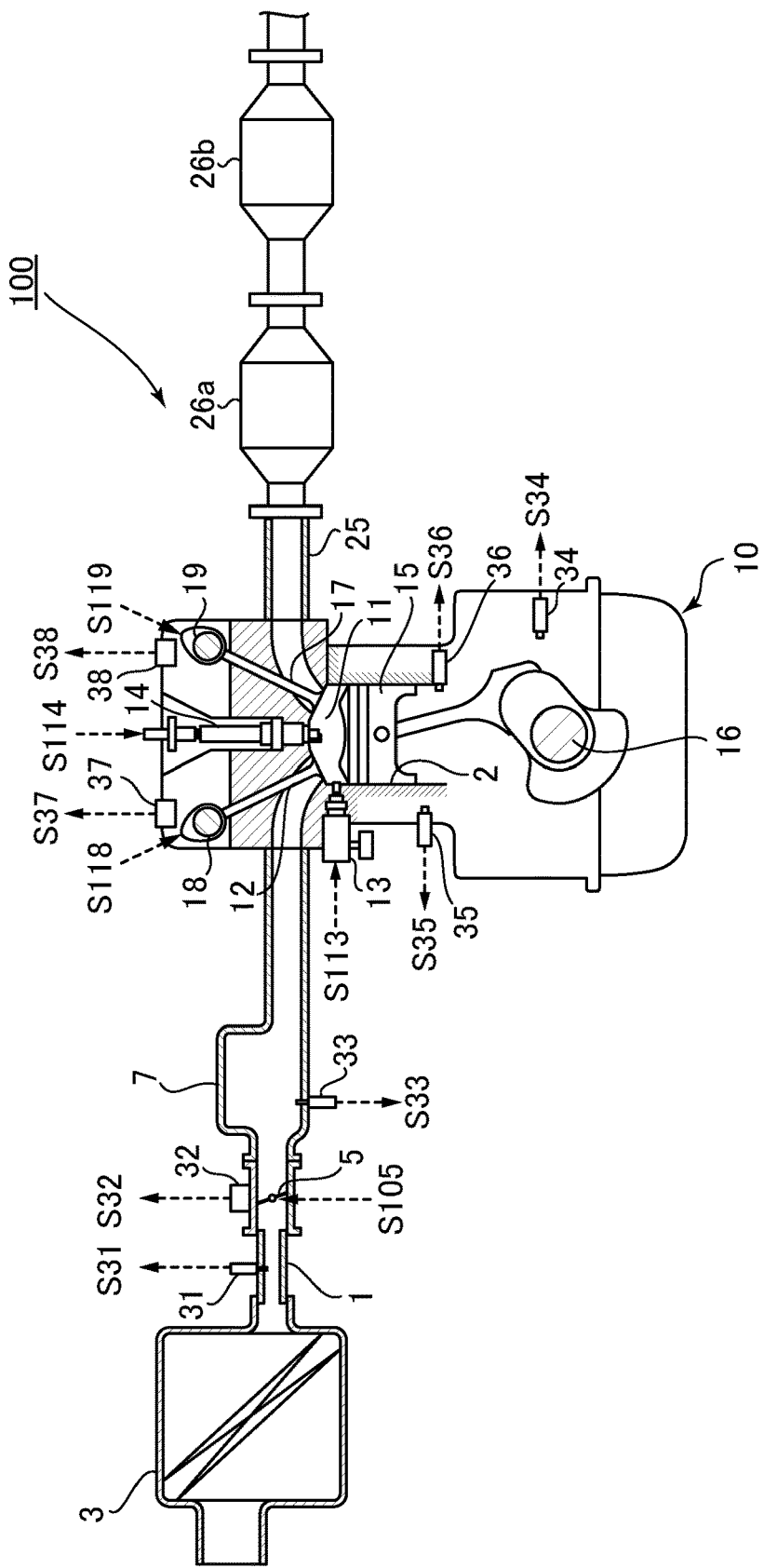
FIG. 1 is a schematic diagram depicting a configuration of an engine system employing a vehicle control device according to one embodiment of the present invention.
Figure 2:
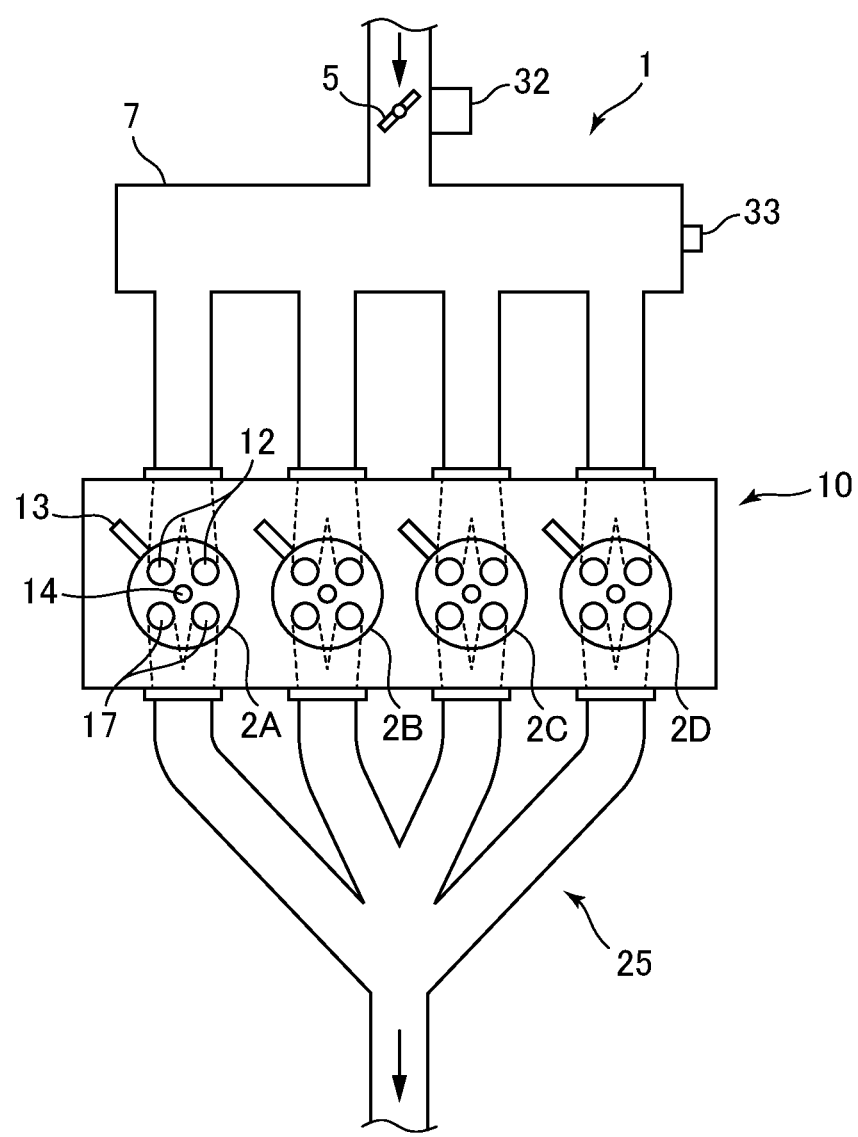
FIG. 2 is a schematic top plan view depicting an engine usable with the vehicle control device according to this embodiment.
Figure 3:
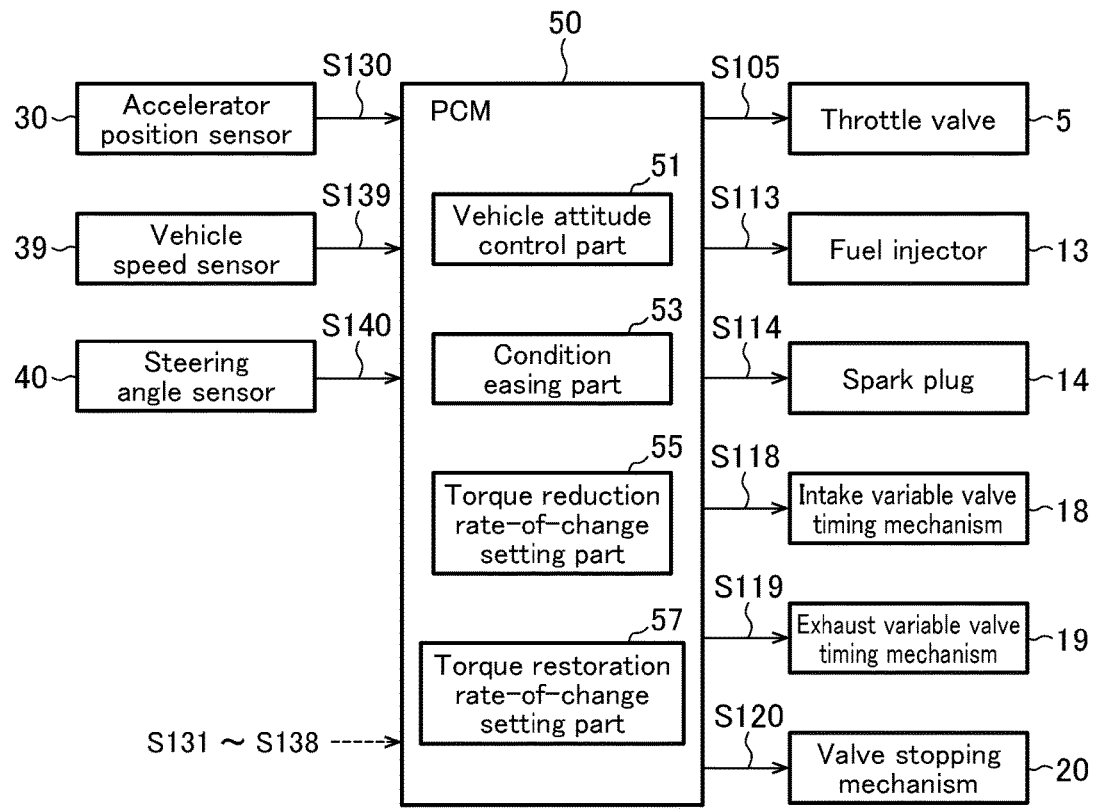
FIG. 3 is a block diagram depicting an electrical configuration of the vehicle control device according to this embodiment.

First of all, with reference to FIGS. 1 to 3, an engine system employing a vehicle control device according to one embodiment of the present invention will be described. FIG. 1 is a schematic diagram depicting a configuration of the engine system employing the vehicle control device according to this embodiment. FIG. 2 is a schematic top plan view depicting an engine usable with the vehicle control device according to this embodiment. FIG. 3 is a block diagram depicting an electrical configuration of the vehicle control device according to this embodiment.

As depicted in FIGS. 1 to 3, the engine system 100 primarily comprises: an intake passage 1 for allowing intake air (air) introduced from outside to pass therethrough; an engine 10 (specifically, gasoline engine) for generating a vehicle driving force through combustion of a mixture of intake air supplied from the intake passage 1 and fuel supplied from an aftermentioned fuel injector 13; an exhaust passage 25 for discharging exhaust gas produced by the combustion within the engine 10; a plurality of sensors 30 to 40 for detecting various states regarding the engine system 100; and a PCM (Power-train Control Module) 50 for controlling the entirety of the engine system 100.

The intake passage 1 is provided with: an air cleaner 3 for cleaning intake air introduced from the outside; a throttle valve 5 for adjusting an amount of intake air passing therethrough (intake air amount); and a surge tank 7 for temporarily storing intake air to be supplied to the engine 10, which are arranged in this order from the side of an upstream end of the intake passage 1.

As depicted in FIG. 2, the engine 10 in this embodiment is an in-line four-cylinder engine having four cylinders 2 (2A to 2D) linearly arranged side-by-side. This engine 10 is primarily provided with: an intake valve 12 for selectively introducing intake air from the intake passage 1 into a combustion chamber 11; a fuel injector 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging, to the exhaust passage 25, exhaust gas produced by the combustion of the air-fuel mixture within the combustion chamber 11.

The four pistons 15 provided in the cylinders 2A to 2D are configured such that they are reciprocatingly moved with a phase difference of 180 degrees crank angle (180° C.A). Correspondingly, ignition timings in the cylinders 2A to 2D are set such that they are sequentially shifted in phase by 180° C.A.

The engine 10 in this embodiment is a cylinder deactivatable engine capable of being operated in a mode in which two of the four cylinders 2A to 2D are deactivated and the remaining two cylinders are activated, i.e., in a reduced-cylinder operation mode.

Specifically, assuming that the cylinder 2A, the cylinder 2B, the cylinder 2C and the cylinder 2D arranged in this order rightwardly in FIG. 2 are defined, respectively, as a first cylinder, a second cylinder, a third cylinder and a fourth cylinder, ignition (firing) is performed in the following order: the first cylinder 2A→the third cylinder 2C→the fourth cylinder 2D→the second cylinder 2B, during an all-cylinder operation mode in which all of the four cylinders 2A to 2D are activated.

On the other hand, during the reduced-cylinder operation mode, an ignition operation of the spark plugs 14 is prohibited in two of the cylinders which are mutually non-consecutive in terms of a firing order (combustion order) (in this embodiment, the first cylinder 2A and the fourth cylinder 2D), and alternately performed in the remaining two cylinders (i.e., the third cylinder 2C and the second cylinder 2B).

Further, the engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, it is possible to employ any of various heretofore-known types. For example, a variable valve timing mechanism of an electromagnetic type or a hydraulic type may be employed to variably control the operation timings of the intake valve 12 and the exhaust valve 17.

The engine 10 is further provided with a valve stopping mechanism 20 for stopping opening and closing operations of the intake valves 12 and the exhaust valves 17 in the first and fourth cylinders 2A, 2D, during the reduced-cylinder operation mode. For example, the valve stopping mechanism 20 is constructed such that it comprises a so-called lost motion mechanism interposed between a cam and a valve and operable to selectively enable and disable a driving force of the cam to be transmitted to the valve. Alternatively, the valve stopping mechanism 20 may be constructed such that it comprises a so-called cam shifting mechanism operable to selectively transmit one of operation states of two first and second cams having different cam profiles, wherein the first cam has a cam profile capable of enabling opening and closing operation of a valve, and the second cam has a cam profile capable of disabling (stopping) the opening and closing operation of the valve.

The exhaust passage 25 is primarily provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be described as "exhaust gas purifying catalyst 26".

As mentioned above, the engine system 100 is provided with a plurality of sensors 30 to 40 for detecting various states regarding the engine system 100. Specifically, these sensors 30 to 40 are as follows. The sensor 30 is an accelerator position sensor operable to detect an accelerator position, i.e., an angular position of an accelerator pedal (which is equivalent to an amount of depression of the accelerator pedal manipulated by a driver). The sensor 31 is an airflow sensor operable to detect an intake air amount which is equivalent to a flow rate of intake air passing through the intake passage 1. The sensor 32 is a throttle opening sensor operable to detect a throttle opening which is an opening degree of the throttle valve 5. The sensor 33 is a pressure sensor operable to detect an intake manifold pressure (internal pressure of an intake manifold) which is equivalent to a pressure of intake air supplied to the engine 10. The sensor 34 is a crank angle sensor operable to detect a crank angle of the crankshaft 16 (the crank angle sensor 34 corresponds to the engine speed sensor). The sensor 35 is a water temperature sensor operable to detect a water temperature which is a temperature of cooling water for cooling the engine 10. The sensor 36 is an in-cylinder temperature sensor operable to detect an in-cylinder temperature which is an internal temperature of each of the cylinders 2 of the engine 10. The sensors 37 and 38 are, respectively, an intake-side cam angle sensor operable to detect operation timings of the intake valve 12 including a valve-closing timing, and an exhaust-side cam angle sensor operable to detect operation timings of the exhaust valve 17 including a valve-closing timing. The sensor 39 is a vehicle speed sensor operable to detect a speed of a vehicle equipped with the engine 10 (vehicle speed). The sensor 40 is a steering angle sensor operable to detect a rotational angle of a steering wheel of the vehicle. The above sensors 30 to 40 are operable to output, to the PCM 50, detection signals S130 to S140 corresponding to detected parameters, respectively.

The PCM 50 is operable, based on the detection signals S130 to S140 input from the above sensors 30 to 40, to perform controls for various components in the engine system 100. Specifically, as depicted in FIG. 3, the PCM 50 is operable to: supply a control signal S105 to the throttle valve 5 to control of opening and closing timings and the throttle opening of the throttle valve 5; supply a control signal S113 to the fuel injector 13 to control a fuel injection amount and a fuel injection timing; supply a control signal S114 to the spark plug 14 to control an ignition timing; supply control signals S118, S119, respectively, to the intake variable valve timing mechanism 18 and the exhaust variable valve timing mechanism 19 to control the operation timings of the intake valve 12 and the exhaust valve 17; and supply a control signal S120 to the valve stopping mechanism 20 to control disabling/enabling of the opening and closing operations of the intake valves 12 and the exhaust valves 17 in the first and fourth cylinders 2A, 2D. Each of the throttle valve 5, the fuel injector 13, the spark plug 14, the intake variable valve timing mechanism 18 and the exhaust variable valve timing mechanism 19 is equivalent to an example of "engine torque adjustment mechanism" set forth in the appended claims.

In this embodiment, the PCM 50 comprises the following functional elements. First, the PCM 50 comprises a vehicle attitude control part 51 operable, upon satisfaction of a condition (vehicle attitude control-starting (executing) condition) that the vehicle is traveling, and a steering angle-related value relevant to a steering angle of the steering wheel (typically, steering speed) is increasing, to execute a vehicle attitude control for controlling vehicle attitude, by reducing the engine torque to generate vehicle deceleration. This vehicle attitude control part 51 is further operable, upon satisfaction of a given condition for terminating the vehicle attitude control (vehicle attitude control-terminating condition), to control the engine 10 to restore the engine torque to an original level of torque before the execution of the vehicle attitude control.

Second, the PCM 50 comprises a condition easing part 53 operable to gradually ease the vehicle attitude control-starting condition, as the number of times of combustion per unit time in the engine 10 becomes smaller. Specifically, the condition easing part 53 is operable to change a given parameter defining the vehicle attitude control-starting condition, to facilitate the start of the vehicle attitude control, and change a given parameter defining the vehicle attitude control-terminating condition, to facilitate the termination of the vehicle attitude control.

Third, the PCM 50 comprises a torque reduction rate-of-change setting part 55 operable to, as the number of times of combustion per unit time in the engine 10 becomes smaller, set the rate (rapidity) of change of the engine torque in a reduction direction in the starting stage of the vehicle attitude control, to a larger value, i.e., set an amount of reduction per unit time in engine torque, to a larger value. The vehicle attitude control part 51 is operable to control the engine 10 to reduce the engine torque, according to the rate of change set in the above manner by the torque reduction rate-of-change setting part 55. Further, the PCM 50 comprises a torque restoration rate-of-change setting part 57 operable to, as the number of times of combustion per unit time in the engine 10 becomes smaller, set the rate of change of the engine torque in a restoration direction, to a larger value, i.e., set an amount of increase per unit time in engine torque, to a larger value, in a terminating stage of the vehicle attitude control. The vehicle attitude control part 51 is operable to control the engine 10 to restore the engine torque, according to the rate of change set in the above manner by the torque restoration rate-of-change setting part 57.

The above elements of the PCM 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Figure 4:
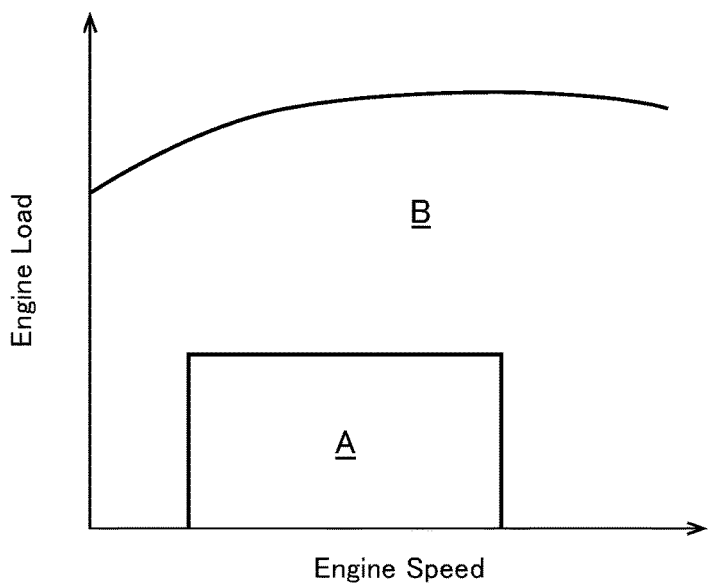
FIG. 4 is a map conceptually presenting engine operation ranges between which switching of engine operation mode is performed by the vehicle control device according to this embodiment.

Here, with reference to FIG. 4, the following description will be made about operation ranges in which the engine in this embodiment is operated, respectively, in the reduced-cylinder operation mode and the all-cylinder operation mode. FIG. 4 is a map conceptually presenting engine operation ranges between which switching of engine operation mode is performed by the vehicle control device according to this embodiment. In FIG. 4, the horizontal axis represents engine speed, and the vertical axis represents engine load. As depicted in FIG. 4, a reduced-cylinder operation range A in which the engine is operated in the reduced-cylinder operation mode is set in a zone having a relatively low engine speed and a relatively low engine load, and an all-cylinder operation range B is set in a zone other than the reduced-cylinder operation range A. The PCM 50 is operable, referring to such a map, to determine within which of the reduced-cylinder operation range A and the all-cylinder operation range B current values of the engine speed and the engine load fall, and, depending on a result of the determination, to control disabling/enabling of the opening and closing operations of the intake valves 12 and the exhaust valves 17 in the first and fourth cylinders 2A, 2D, so as to execute one of the reduced-cylinder operation mode and the all-cylinder operation mode.

<Details of Control in this Embodiment>

Next, with reference to FIGS. 5 to 9, control to be performed by the vehicle control device according to this embodiment will be described.

Figure 5:
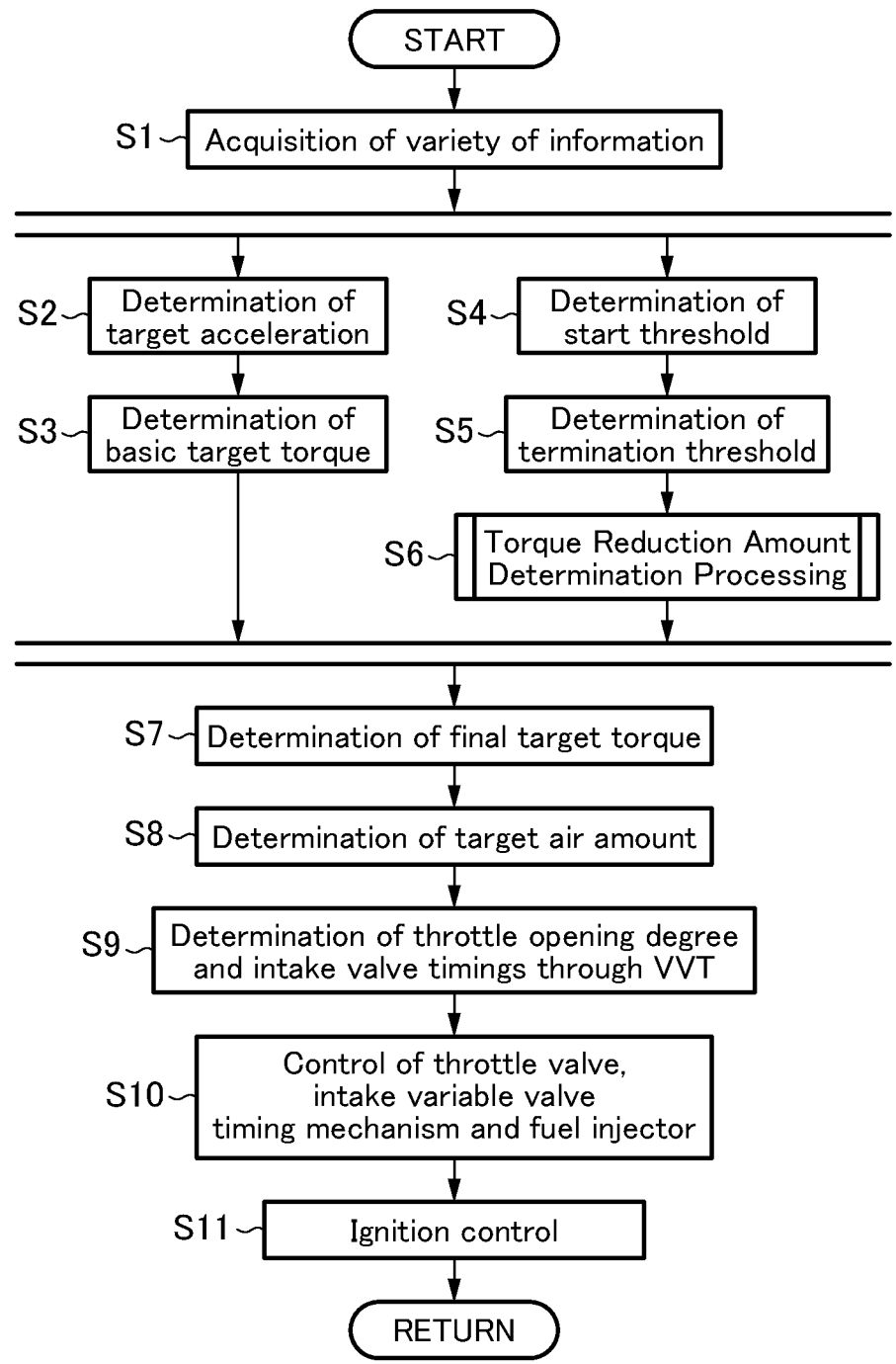
FIG. 5 is a flowchart of an engine control processing routine to be executed by the vehicle control device according to this embodiment.
Figure 7:
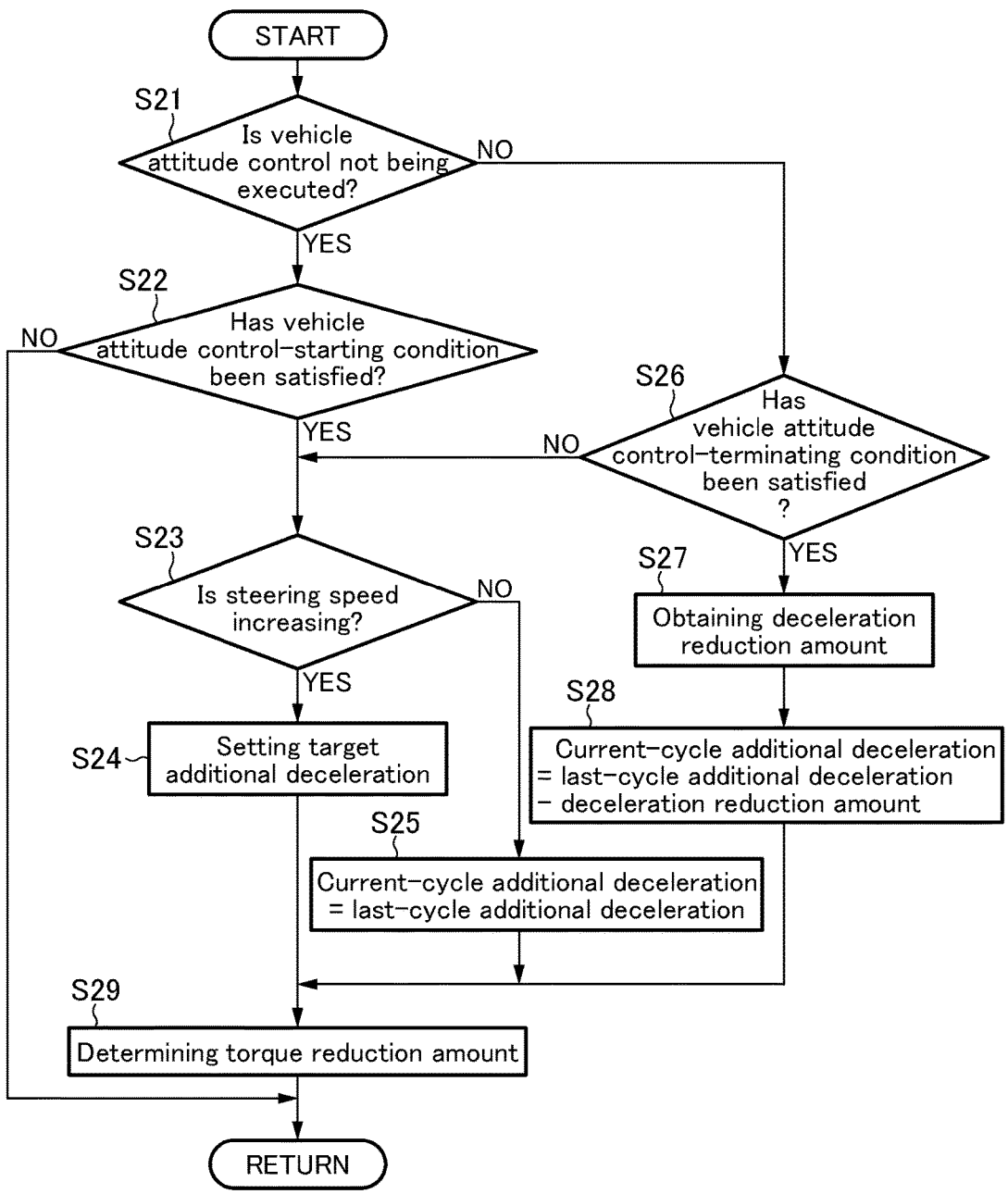
FIG. 7 is a flowchart of a torque reduction amount determination processing subroutine in the engine control processing routine to be executed by the vehicle control device according to this embodiment.
Figure 8:
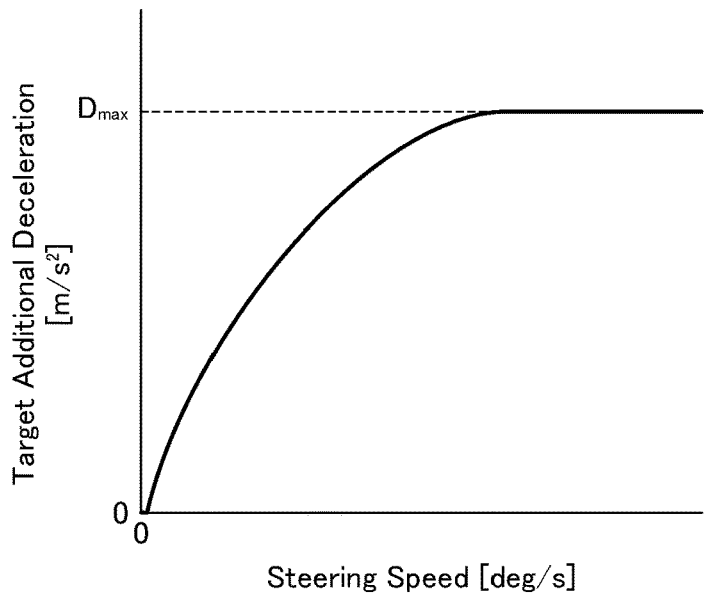
FIG. 8 is a map depicting a relationship between a steering speed, and a target additional deceleration to be determined by the vehicle control device according to this embodiment.
Figure 9:
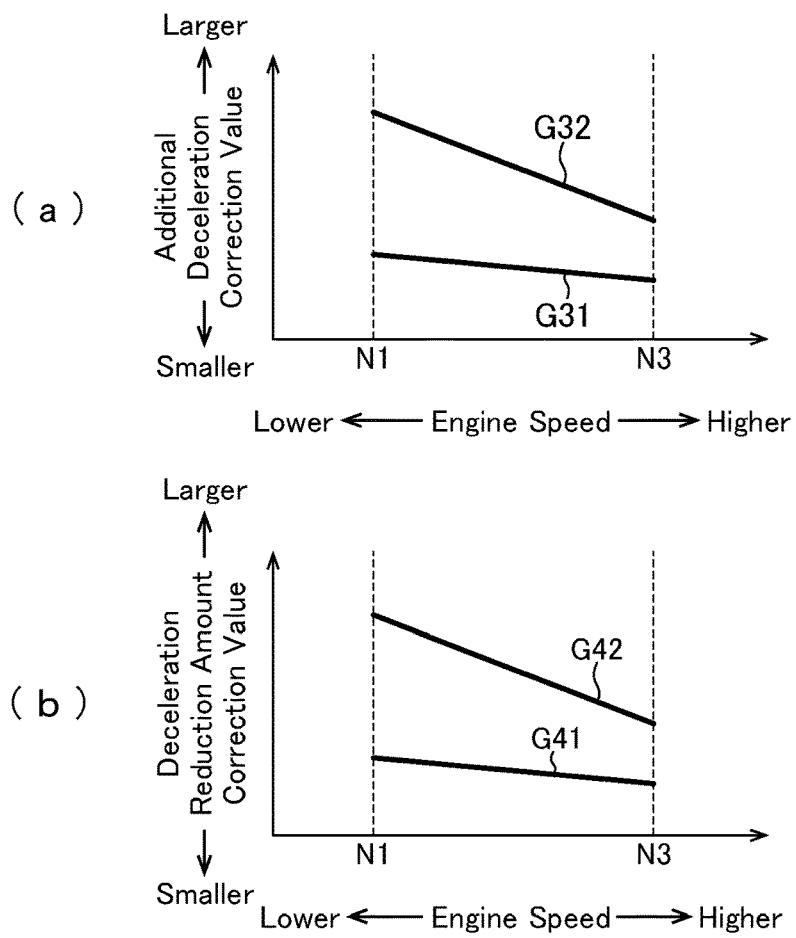
FIGS. 9(a) and 9(b) are maps for correcting deceleration, in the engine control processing routine to be executed by the vehicle control device according to this embodiment.

FIG. 5 is a flowchart of an engine control processing routine to be executed by the vehicle control device according to this embodiment. FIGS. 6(*a*) and 6(*b*) are maps defining a vehicle attitude control start threshold and a vehicle attitude control termination threshold in the engine control processing routine to be executed by the vehicle control device according to this embodiment. FIG. 7 is a flowchart of a torque reduction amount determination processing subroutine in the engine control processing routine to be executed by the vehicle control device according to this embodiment. FIG. 8 is a map depicting a relationship between a steering speed, and a target additional deceleration to be determined by the vehicle control device according to this embodiment. FIGS. 9(*a*) and 9(*b*) are maps for correcting deceleration, in the engine control processing routine to be executed by the vehicle control device according to this embodiment.

The engine control processing routine in FIG. 5 is activated when an ignition switch of the vehicle is turned on to apply power to the PCM 50, and repeatedly executed with a given cycle period. Further, this engine control processing routine is basically executed during traveling of the vehicle.

As depicted in FIG. 5, upon start of the engine control processing routine, in step S1, the PCM 50 operates to acquire information about a vehicle driving state. Specifically, the PCM 50 operates to acquire, as information about the vehicle driving state, detection signals S130 to S140 output from the aforementioned sensors 30 to 40, including the accelerator position detected by the accelerator position sensor 30, the vehicle speed detected by the vehicle speed sensor 39, the steering angle detected by the steering angle sensor 40, and a speed stage currently set in an automatic transmission of the vehicle. The PCM 50 also operates to determine, based on current values of the engine speed and the engine load, in which of the reduced-cylinder operation mode and the all-cylinder operation mode the engine 10 is operated, and acquire this determined engine operation mode as information about the vehicle driving state. In this case, the PCM 50 operates to determine the engine operation mode with reference to the map in FIG. 4.

Subsequently, in step S2, the PCM 50 operates to set a target acceleration, based on the vehicle driving state including manipulation of the accelerator pedal, acquired in the step S1. Specifically, the PCM operates to select, from among a plurality of acceleration characteristic maps each defining a relationship between acceleration and accelerator position, with respect to various vehicle speeds and various transmission speed stages (the maps are preliminarily created and stored in a memory or the like), one acceleration characteristic map corresponding to current values of the vehicle speed and the transmission speed stage, and refer to the selected acceleration characteristic map to determine, as a target acceleration, a value of the acceleration corresponding to a current value of the accelerator position.

Subsequently, in step S3, the PCM 50 operates to determine a basic target torque of the engine 10 for realizing the target acceleration determined in the step S2. In this case, the PCM 50 operates to determine the basic target torque within a torque range outputtable by the engine 10, based on current values of the vehicle speed, the transmission speed stage, road grade, road surface mu (μ), etc.

In parallel with the processings in the steps S2 and S3, processing in steps S4 to S6 are performed. Specifically, based on a current value of the engine speed and a current one of the engine operation modes (the reduced-cylinder operation mode or the all-cylinder operation mode), the PCM 50 operates, in step S4, to determine a start threshold defining the vehicle attitude control-starting condition, and then, in step S5, to determine a termination threshold defining the vehicle attitude control-terminating condition. The start threshold and the termination threshold are thresholds for performing determinations based on a rate change in the steering angle, when starting and terminating the vehicle attitude control (the determinations themselves based on the rate of change of the steering angle are performed in an aftermentioned torque reduction amount determination processing subroutine). With reference to FIGS. 6(*a*) and 6(*b*), the start threshold and the termination threshold will be specifically described here.

FIG. 6(*a*) depicts a map defining a relationship between the engine speed (horizontal axis) and the start threshold (vertical axis), and FIG. 6(*b*) depicts a map defining a relationship between the engine speed (horizontal axis) and the termination threshold (vertical axis). Further, in FIGS. 6(*a*) and 6(*b*), lines G11, G21 represent map data to be applied in the all-cylinder operation mode, and lines G12, G22 represent map data to be applied in the reduced-cylinder operation mode.

As depicted in FIG. 6(*a*), in this embodiment, the start threshold is set to a smaller value, as the engine speed becomes lower. In addition, in the reduced-cylinder operation mode, the start threshold is set to a smaller value than that in the all-cylinder operation mode. The vehicle attitude control-starting condition is satisfied when the rate of change of the steering angle is equal to or greater than the start threshold. Thus, if the start threshold is set to a smaller value in the above manner, the rate of change of the steering angle can easily become equal to or greater than the start threshold, and thereby the vehicle attitude control-starting condition will be eased. In this embodiment, when the engine is operated at a relatively low engine speed or in the reduced-cylinder operation mode, i.e., when the number of times of combustion per unit time in the engine 10 is relatively small, the start threshold is set to a relatively small value to ease the vehicle attitude control-starting condition, so as to suppress deterioration in responsiveness of torque reduction in the starting stage of the vehicle attitude control.

On the other hand, as depicted in FIG. 6(*b*), in this embodiment, the termination threshold is set to a larger value, as the engine speed becomes lower. In addition, in the reduced-cylinder operation mode, the termination threshold is set to a larger value than that in the all-cylinder operation mode. The vehicle attitude control-terminating condition is satisfied when the rate of change of the steering angle is less than the termination threshold. Thus, if the termination threshold is set to a larger value in the above manner, the rate of change of the steering angle can easily become less than the termination threshold, and thereby the vehicle attitude control-terminating condition will be eased. In this embodiment, when the engine is operated at a relatively low engine speed or in the reduced-cylinder operation mode, i.e., when the number of times of combustion per unit time in the engine 10 is relatively small, the termination threshold is set to a relatively large value to ease the vehicle attitude control-terminating condition, so as to suppress deterioration in responsiveness of torque restoration, in the terminating stage of the vehicle attitude control.

In FIGS. 6(*a*) and 6(*b*), the engine speed N1 is set to a value greater than at least an engine idle speed. Basically, in a range having an engine speed of less than N1, the vehicle attitude control is not performed (because there are few advantages in executing the vehicle attitude control in such a range). Further, the engine speed N3 is set to a value serving as a lower limit value of an engine speed range in which almost no advantageous effect is brought out even if the start threshold and the termination threshold are changed according to the engine speed. For example, the engine speed N1 is set in the range of about 700 to 1200 rpm, and the engine speed N3 is set in the range of about 2800 to 3200 rpm. Further, the engine speed N2 located between N1 and N3 is set in the range of about 1800 to 2200 rpm. These engine speeds N1, N3 are also applied to aftermentioned maps in FIGS. 9(*a*) and 9(*b*).

In FIGS. 6(*a*) and 6(*b*), each of the start threshold and the termination threshold is continuously changed according to the engine speed. Alternatively, each of the start threshold and the termination threshold may be changed in a stepwise manner, according to the engine speed. In one example, depending on whether the engine speed is less than a given engine speed, or equal to or greater than the given engine speed, each of the start threshold and the termination threshold may be changed in a stepwise manner.

Returning to FIG. 5 again, in step S6, the PCM 50 operates to execute a torque reduction amount determination processing subroutine for determining a torque reduction amount in the above torque reduction control (vehicle attitude control), based on the steering angle of the steering wheel detected by the steering angle sensor 40. Details of the torque reduction amount determination processing subroutine will be described later.

Subsequently, in step S7, the PCM 50 operates to subtract the torque reduction amount determined in the torque reduction amount determination processing subroutine in the step S6, from the basic target torque determined in the step S3 to thereby determine a final target torque.

Subsequently, the processing routine proceeds to step S8. In the step S8, the PCM 50 operates to determine a target air amount and a target fuel amount, which are required for the engine 10 to output the final target torque determined in the step S7. As used herein, the term "air amount" means an amount of air to be introduced into the combustion chamber 11 of the engine 10. It is to be understood that non-dimensional charging efficiency may be used in place of the air amount. Specifically, the PCM 50 operates to calculate a target indicated torque based on the final target torque and by additionally taking into consideration a loss torque due to friction loss and pumping loss, and calculate a target fuel amount required for generating the target indicated torque, and, based on the calculated target fuel amount and a target equivalent ratio, to determine a target air amount.

Subsequently, in step S9, the PCM 50 operates to determine an opening degree of the throttle valve 5, and opening and closing timings of the intake valve 12 through the intake variable valve timing mechanism 18, while taking into account the air amount detected by the airflow sensor 31, so as to enable air to be introduced into the engine 10 in an amount equal to the target air amount determined in the step S8.

Subsequently, in step S10, the PCM 50 operates to control the throttle valve 5 and the intake variable valve timing mechanism 18, based on the throttle opening and the opening and closing timings of the intake valve 12 set in the step S9, and control the fuel injector 13, based on the target fuel amount calculated in the step S8.

Subsequently, in step S11, the PCM 50 operates to, based on the final target torque determined in the step S7 and an actual air amount actually introduced into the combustion chamber 11 by controlling the throttle valve 5 and the intake variable valve timing mechanism 18 in the step S9, set an ignition timing for causing the engine 10 to output the determined final target torque, and control an ignition timing adjustment device for adjusting an ignition timing of the spark plug 14 so as to perform ignition at the set ignition timing. After the step S11, the PCM 50 terminates the engine control processing routine.

Next, the torque reduction amount determination processing subroutine depicted in FIG. 7 will be described. This torque reduction amount determination processing subroutine is executed in the step S6 in FIG. 5.

Upon start of the torque reduction amount determination processing subroutine, in step S21, the PCM 50 operates to determine whether the vehicle attitude control is not currently being executed. As a result, when the vehicle attitude control is determined to be not being executed (step S21: YES), the processing subroutine proceeds to step S22. In the step S22, the PCM 50 operates to determine whether or not the vehicle attitude control-starting condition has been satisfied. Specifically, the PCM 50 operates to determine whether or not the rate of change of the steering angle (which may be a steering speed calculated based on the steering angle acquired in the step S1) is equal to or greater than the start threshold set in the step S4 in FIG. 5 (additionally see FIG. 6(a)). As a result, when the rate of change of the steering angle is determined to be equal to or greater than the start threshold, i.e., the vehicle attitude control-starting condition is determined to have been satisfied (step S22: YES), the processing subroutine proceeds to step S23. On the other hand, when the rate of change of the steering angle is determined to be less than the start threshold, i.e., the vehicle attitude control-starting condition is determined to have not been satisfied (step S22: NO), the processing subroutine is terminated.

Subsequently, in the step S23, the PCM 50 operates to determine whether or not the steering speed (rate of change of the steering angle) is increasing. As a result, when the steering speed is determined to be increasing (step S23: YES), the processing subroutine proceeds to step S24. In the step S24, the PCM 50 operates to set a target additional deceleration based on the steering speed. This target additional deceleration is a deceleration to be added to the vehicle according to the steering wheel manipulation, in order to accurately realize vehicle behavior intended by a driver.

Basically, based on a relationship between the target additional deceleration and the steering speed, presented by the map in FIG. 8, the PCM 50 operates to obtain a value of the target additional deceleration corresponding to a current value of the steering speed. In FIG. 8, the horizontal axis represents steering speed, and the vertical axis represents target additional deceleration. As depicted in FIG. 8, as the steering speed becomes larger, a value of the target additional deceleration corresponding to this steering speed comes closer to a given upper limit value (e.g., 1 m/s$^2$). Specifically, as the steering speed becomes larger, the target additional deceleration becomes larger, and an increase rate of the target additional deceleration becomes smaller.

In this embodiment, the PCM 50 also operates to correct the target additional deceleration determined by the above map in FIG. 8, based on the engine speed and the engine operation mode (the reduced-cylinder operation mode or the all-cylinder operation mode). Details of this correction will be described later.

On the other hand, when the steering speed is determined in the step S23 to be not increasing (step S23: NO), i.e., when the steering speed is determined in the step S23 to be decreasing or maintained constant, the processing subroutine proceeds to step S25. In the step S25, the PCM 50 operates to determine, as an additional deceleration in a current processing cycle (current-cycle additional deceleration), an additional deceleration determined in the last processing cycle (last-cycle additional deceleration).

On the other hand, as a result of the determination in the step S21, when the vehicle attitude control is determined to be already being executed (step S21: NO), the processing subroutine proceeds step S26. In the step S26, the PCM 50 operates to determine whether or not the vehicle attitude control-terminating condition has been satisfied. Specifically, the PCM 50 operates to determine whether or not the rate of change of the steering angle is less than the termination threshold set in the step S5 in FIG. 5 (additionally see FIG. 6(b)). As a result, when the rate of change of the steering angle is determined to be equal to or greater than the given value, i.e., the vehicle attitude control-terminating condition is determined to have not been satisfied (step S26: NO), the processing subroutine proceeds to the step S23. In this case, the PCM 50 operates to perform processings in the step S23 and the subsequent steps so as to continue the vehicle attitude control.

On the other hand, when the rate of change of the steering angle is determined to be less than the termination threshold, i.e., the vehicle attitude control-terminating condition is determined to have been satisfied (step S26: YES), the processing subroutine proceeds to step S27. In the step S27, the PCM 50 operates to obtain an amount (deceleration reduction amount) by which the additional deceleration determined in the last processing cycle (last-cycle additional deceleration) is reduced in the current processing cycle. In one example, the PCM 50 is configured to calculate the deceleration reduction amount, based on a reduction rate according to the steering speed and using a map similar to that depicted in FIG. 8, in the same manner as that for the target additional deceleration. In another example, the PCM 50 is configured to calculate the deceleration reduction amount, based on a constant reduction rate (e.g., 0.3 m/s$^3$) preliminarily stored in a memory or the like. In this embodiment, the PCM 50 also operates to correct the deceleration reduction amount calculated in this manner, based on the engine speed and the engine operation mode (the reduced-cylinder operation mode or the all-cylinder operation mode). Details of this correction will be described later.

Subsequently, in step S28, the PCM 50 operates to determine a value of the additional deceleration in the current processing cycle (current-cycle additional deceleration) by subtracting the deceleration reduction amount obtained in the step S27 from a value of the additional deceleration determined in the last processing cycle (last-cycle additional deceleration).

After completion of the step S24, S25 or S28, in step S29, the PCM 50 operates to determine the torque reduction amount, based on the current-cycle additional deceleration determined in the step S24, S25 or S28. Specifically, the PCM 50 operates to determine a value of the torque reduction amount required for realizing the current-cycle additional deceleration, based on current values of the vehicle speed, the transmission speed stage, the road gradient and others acquired in the step S1. After completion of the step S29, the PCM 50 terminates the torque reduction amount determination processing subroutine, and returns to the main routine.

When determining the target additional deceleration in the step S24 in FIG. 7, it is desirable to determine the current-cycle additional deceleration under the condition that the increase rate of the additional deceleration is equal to or less than a given threshold (e.g., 0.5 m/s$^3$). Specifically, when an increase rate from a value of the additional deceleration determined in the last processing cycle (last-cycle additional deceleration) to the target additional deceleration determined in the step S24 in the current processing cycle is equal to or less than the given threshold, the PCM 50 operates to determine the target additional deceleration determined in the step S24 in the current processing cycle, as a value of the additional deceleration in the current processing cycle (current-cycle additional deceleration). On the other hand, when the increase rate from the last-cycle additional deceleration to the target additional deceleration determined in the step S24 in the current processing cycle is greater than the given threshold, the PCM 50 operates to determine, as the current-cycle additional deceleration, a value obtained by increasing the last-cycle additional deceleration at the given threshold (increase rate) for the given cycle period.

Next, with reference to FIGS. 9(*a*) and 9(*b*), a method for correcting each of the target additional deceleration and the deceleration reduction amount in this embodiment will be described. In FIG. 9(*a*), the horizontal axis represents engine speed, and the vertical axis represents a correction value for correcting the target additional deceleration (additional deceleration correction value). In FIG. 9(*b*), the horizontal axis represents engine speed, and the vertical axis represents a correction value for correcting the deceleration reduction amount (deceleration reduction amount correction value). Further, in FIGS. 9(*a*) and 9(*b*), lines G31, G41 represent map data to be applied in the all-cylinder operation mode, and lines G32, G42 represent map data to be applied in the reduced-cylinder operation mode.

Correction using these correction values is performed by multiplying each of the target additional deceleration and the deceleration reduction amount by a corresponding one of the correction values. In this example, as each of the correction values (absolute values) becomes larger, a corresponding one of the target additional deceleration and the deceleration reduction amount is corrected more largely. Correcting the target additional deceleration more largely means adding the additional deceleration to the vehicle more quickly. Further, correcting the deceleration reduction amount more largely means reducing deceleration of the vehicle more quickly, i.e., restoring the reduced engine torque to an original state before applying deceleration to the vehicle, more quickly.

As depicted in FIG. 9(*a*), in this embodiment, the additional deceleration correction value is set such that it becomes larger as the engine speed becomes lower. In addition, the additional deceleration correction value in the reduced-cylinder operation mode is set to be greater than that in the all-cylinder operation mode. In this embodiment, when the engine is operated at a relatively low engine speed or in the reduced-cylinder operation mode, i.e., when the number of times of combustion per unit time in the engine 10 is relatively small, the additional deceleration correction value is increased to increase the rate of change of the target additional deceleration and thus increase the rate of change of the engine torque in the reduction direction to thereby suppress deterioration in responsiveness of torque reduction in the starting stage of the vehicle attitude control.

Further, as depicted in FIG. 9(*b*), in this embodiment, the deceleration reduction amount correction value is set such that it becomes larger as the engine speed becomes lower. In addition, the deceleration reduction amount correction value in the reduced-cylinder operation mode is set to be greater than that in the all-cylinder operation mode. In this embodiment, when the engine is operated at a relatively low engine speed or in the reduced-cylinder operation mode, i.e., when the number of times of combustion per unit time in the engine 10 is relatively small, the deceleration reduction amount correction value is increased to increase the rate of change of the deceleration reduction amount and thus increase the rate of change of the engine torque in the restoration direction to thereby suppress deterioration in responsivity of torque restoration in the terminating stage of the vehicle attitude control.

In FIGS. 9(*a*) and 9(*b*), each of the additional deceleration correction value and the deceleration reduction amount correction value is continuously changed according to the engine speed. Alternatively, each of the additional deceleration correction value and the deceleration reduction amount correction value may be changed in a stepwise manner, according to the engine speed. In one example, depending on whether the engine speed is less than a given engine speed, or equal to or greater than the given engine speed, each of the additional deceleration correction value and the deceleration reduction amount correction value may be changed in a stepwise manner.

<Functions/Advantageous Effects>

Figure 10:
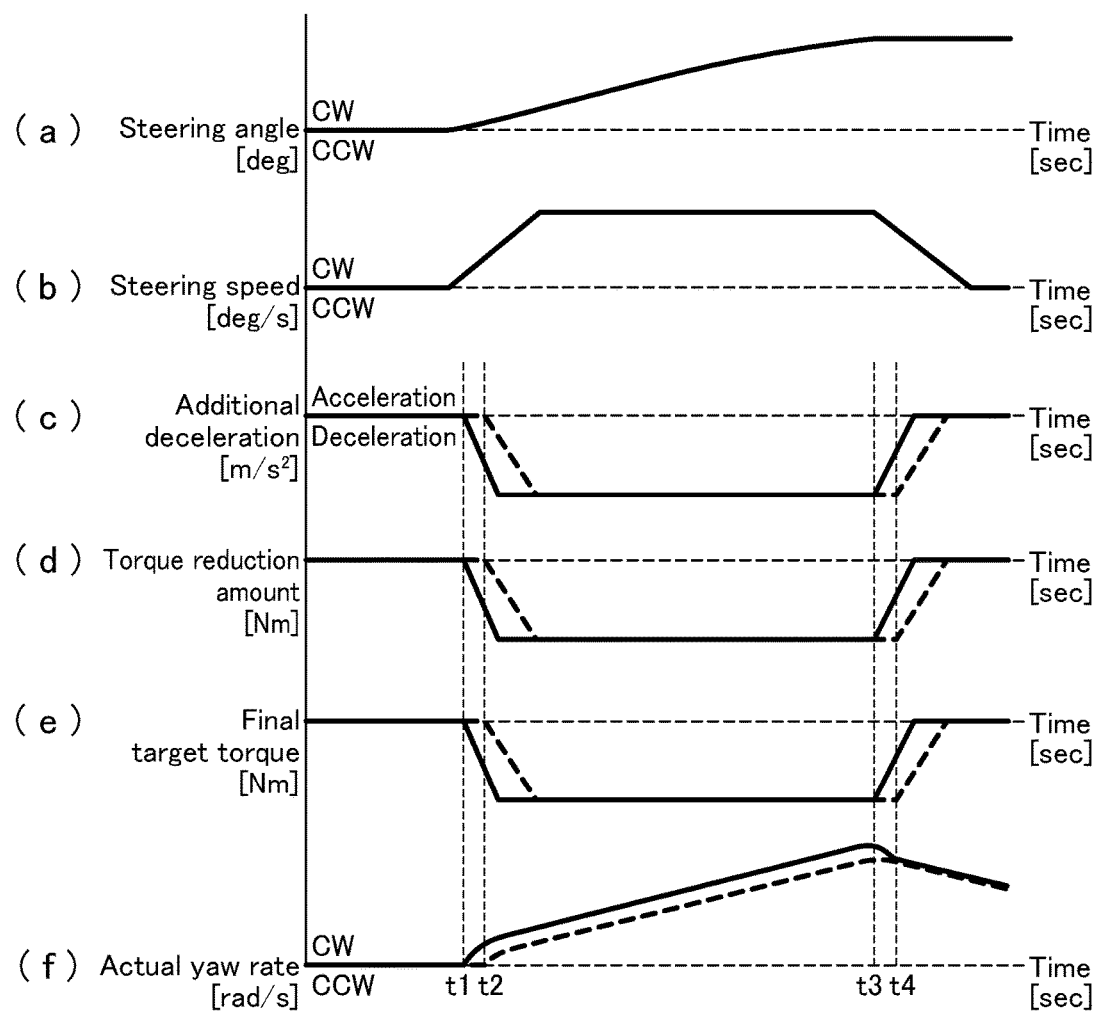
FIGS. 10(a)-10(f) are time charts for explaining functions/advantageous effects of the vehicle control device according to this embodiment.

Next, with reference to FIGS. 10(*a*)-10(*f*), functions/advantageous effects of the vehicle control device according to this embodiment will be described. FIGS. 10(*a*)-10(*f*) are time charts presenting temporal changes in parameters regarding the engine control to be performed when the vehicle equipped with the vehicle control device according to this embodiment turns by manipulation of the steering wheel. FIGS. 10(*a*)-10(*f*) exemplify a situation where the vehicle is turning in a clockwise direction. Further, assume that the engine 10 is operated at a relatively low engine speed and in the reduced-cylinder operation mode.

FIG. 10(*a*) is a chart presenting a change in steering angle of the vehicle which is turning in the clockwise direction. In FIG. 10(*a*), the horizontal axis represents time, and the vertical axis represents steering angle. As depicted in FIG. 10(*a*), clockwise steering is started, and then, along with an additional turning manipulation of the steering wheel, a clockwise steering angle gradually increases and reaches a maximum value. Subsequently, the steering angle is maintained approximately constant.

FIG. 10(*b*) is a chart presenting a change in steering speed of the vehicle which is turning in the clockwise direction as depicted in FIG. 10(*a*). In FIG. 10(*b*), the horizontal axis represents time, and the vertical axis represents steering speed. The steering speed is expressed as a temporal differential value of the steering angle of the vehicle. That is, as depicted in FIG. 10(*b*), when clockwise steering is started, a clockwise steering speed arises and is then maintained approximately constant. Then, when the clockwise steering speed decreases and the clockwise steering angle reaches the maximum value, the steering speed becomes 0. Then, during a period in which the clockwise steering angle is maintained, the steering speed is kept at 0.

FIG. 10(*c*) is a chart presenting a change in additional deceleration determined based on the steering speed depicted in FIG. 10(*b*). In FIG. 10(*c*), the horizontal axis represents time, and the vertical axis represents additional deceleration. In FIG. 10(*c*), the solid line is an additional deceleration line to be applied in this embodiment, and the broken line is an additional deceleration line to be applied in a comparative example (this relation will also be applied to FIGS. 10(*d*) to 10(*f*)).

In the comparative example, each of the start threshold and the termination threshold is set to a constant value, and the start and the termination of the vehicle attitude control are determined using respective ones of the constant start and termination thresholds to start to change the additional deceleration. Further, the additional deceleration is determined based on only the steering speed (e.g., the additional deceleration is determined using only the map in FIG. 8. On the other hand, in this embodiment, each of the start threshold and the termination threshold is variably changed based on the engine speed and the engine operation mode (the reduced-cylinder operation mode or the all-cylinder operation mode), and the start and the termination of the vehicle attitude control are determined using respective ones of the variable start and termination thresholds to start to change the additional deceleration. Further, the additional deceleration determined based on the steering speed in the same manner as that in the comparative example is corrected based on the engine speed and the engine operation mode (the reduced-cylinder operation mode or the all-cylinder operation mode).

Basically, upon satisfaction of the vehicle attitude control-starting condition that the rate of change of the steering angle is equal to or greater than the start threshold, the PCM 50 operates to start the vehicle attitude control to cause the additional deceleration (absolute value) to start increasing. Here, in this embodiment, the PCM 50 operates to set the start threshold to a relatively small value, depending on the state in which the engine 10 is operated at a relatively low engine speed and in the reduced-cylinder operation mode (see FIG. 6(*a*)). Thus, in the comparative example using the non-variable start threshold, an increase in the additional deceleration is started at time t2, whereas, in this embodiment, the increase in the additional deceleration is started at time t1 earlier than the time t2 in the comparative example.

Then, the PCM 50 operates to determine the target additional deceleration according to the steering speed, basically by referring to the map as depicted in FIG. 8. Here, in this embodiment, the PCM 50 operates to set the value for correcting the target additional deceleration (additional deceleration correction value) to a relatively large value, depending on the state in which the engine 10 is operated at a relatively low engine speed and in the reduced-cylinder operation mode (see FIG. 9(*a*)), and correct the target additional deceleration using this additional deceleration correction value. Thus, in this embodiment, as compared to the comparative example in which the target additional deceleration according to the steering speed is not corrected, the rate of change (rapidity of change, slope) of the additional deceleration when being increasing becomes larger (see the solid line and the broken line in FIG. 10(*c*)).

Subsequently, when the steering speed becomes approximately constant, the PCM 50 operates to maintain the additional deceleration. Then, upon satisfaction of the vehicle attitude control-terminating condition that the rate of change of the steering angle is less than the termination threshold, the PCM 50 operates to cause the additional deceleration (absolute value) to start decreasing, so as to terminate the vehicle attitude control. Here, in this embodiment, the PCM 50 operates to set the termination threshold to a relatively large value, depending on the state state in which the engine 10 is operated at a relatively low engine speed and in the reduced-cylinder operation mode (see FIG. 6(*b*)). Thus, in the comparative example using the non-variable termination threshold, a decrease in the additional deceleration is started at time t4, whereas, in this embodiment, the reduction in the additional deceleration is started at time t3 earlier than the time t4 in the comparative example (see the solid line and the broken line in FIG. 10(*c*)).

Then, the PCM 50 operates to determine the deceleration reduction amount, basically by referring to a given map. Further, in this embodiment, the PCM 50 operates to set the correction value for correcting the deceleration reduction amount (deceleration reduction amount correction value) to a relatively large valve, depending on the state state in which the engine 10 is operated at a relatively low engine speed and in the reduced-cylinder operation mode (see FIG. 9(*b*)), and correct the deceleration reduction amount using this deceleration reduction amount correction value. Thus, in this embodiment, as compared to the comparative example in which the deceleration reduction amount is not corrected, the rate of change (rapidity of change, slope) of the additional deceleration when being decreasing becomes larger (see the solid line and the broken line in FIG. 10(*c*)).

FIG. 10(*d*) is a chart presenting a change in the torque reduction amount determined based on the additional deceleration depicted in FIG. 10(*c*). In FIG. 10(*c*), the horizontal axis represents time, and the vertical axis represents torque reduction amount. The PCM 50 operates to determine a value of the torque reduction amount required for realizing the additional deceleration, based on current values of various parameters such as the vehicle speed, the transmission speed stage and the road grade. Thus, in the case where respective values of these parameters are constant, the torque reduction amount is determined such that it changes in the same pattern as that of the additional deceleration depicted in FIG. 10(*c*) (see the solid line and the broken line in FIG. 10(*d*)).

FIG. 10 (*e*) is a chart presenting a change in a final target torque determined based on the basic target torque and the torque reduction amount. In FIG. 10 (*e*), the horizontal axis represents time, and the vertical axis represents torque. The PCM 50 operates to subtract the torque reduction amount determined in the torque reduction amount determination processing subroutine, from the basic target torque (here, assume that the basic target torque is approximately constant), to thereby determine the final target torque. Thus, in each of this embodiment and the comparative example, the change in the torque reduction amount depicted in FIG. 10(*d*) is reflected on the final target torque (see the solid line and the broken line in FIG. 10(*e*)).

FIG. 10(*f*) is a chart presenting a change in a yaw rare (actual yaw rate) generated when control of the engine 10 is performed so as to realize the final target torque in the vehicle which is steered as depicted in FIG. 10(*a*). In FIG. 10(*f*), the horizontal axis represents time, and the vertical axis represents yaw rate.

Basically, after clockwise steering is started, when the torque reduction amount is increased along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. Subsequently, the torque reduction amount is maintained at its maximum value. Thus, it becomes possible to maintain the load applied to the front road wheels and keep up the turn-in ability of the vehicle, as long as the tuning of the steering wheel is continued. Subsequently, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine 10, while stabilizing a vehicle body.

In this embodiment, as compared to the comparative example, in the starting stage of the vehicle attitude control, an increase in the additional deceleration is started at a relatively early timing (i.e., torque reduction is started at a relatively early timing), and the rate of change of the additional deceleration when being increasing is relatively large (the rate of change of the torque reduction is relatively large), so that the actual yaw rate starts increasing at a relatively early timing, and the rate of change of the actual yaw rate when starting rising becomes relatively large (see the solid line and the broken line in FIG. 10(f)). In the comparative example designed without considering the state in which the engine 10 is operated at a relatively low engine speed and in the reduced-cylinder operation mode, the responsiveness of torque reduction in the starting stage of the vehicle attitude control is deteriorated for the reason mentioned in the section "Technical Problem", and the increase of the actual yaw rate tends to be delayed. Compared with this, in this embodiment, considering the state in which the engine 10 is operated at a relatively low engine speed and in the reduced-cylinder operation mode, the start threshold for the vehicle attitude control is corrected to be relatively small, and the rate of change of the additional deceleration when being increasing is corrected to be relatively large, so that it is possible to improve the deterioration in responsiveness of torque reduction in the starting stage of the vehicle attitude control to quickly increase the actual yaw rate.

In this embodiment, as compared to the comparative example, in the terminating stage of the vehicle attitude control, a decrease in the additional deceleration is started at a relatively early timing (i.e., torque restoration is started at a relatively early timing), and the rate of change of the additional deceleration when being decreasing is relatively large (the rate of change of the torque restoration is relatively large), so that the actual yaw rate starts rising at a relatively early timing, and the rate of change of the actual yaw rate when starting decreasing becomes relatively large (see the solid line and the broken line in FIG. 10(f)). In the comparative example designed without considering the state in which the engine 10 is operated at a relatively low engine speed and in the reduced-cylinder operation mode, the responsiveness of torque reduction in the terminating stage of the vehicle attitude control is deteriorated for the reason mentioned in the section "Technical Problem", and the decrease of the actual yaw rate tends to be delayed. Compared with this, in this embodiment, considering the state in which the engine 10 is operated at a relatively low engine speed and in the reduced-cylinder operation mode, the termination threshold for the vehicle attitude control is corrected to be relatively large, and the rate of change of the additional deceleration when being decreasing (rate of restoration) is corrected to be relatively large, so that it is possible to improve the deterioration in responsiveness of torque restoration in the terminating stage of the vehicle attitude control to quickly reduce the actual yaw rate.

<Modifications>

In the above embodiment, the present invention is applied to the engine 10 (four-cylinder engine) to be operated in only two operation modes: the reduced-cylinder operation mode and the all-cylinder operation mode. That is, in this engine 10, the reduced-cylinder operation mode consists only of one mode in which two of the cylinders 2A to 2D are deactivated, and the remaining two cylinders are activated. Alternatively, the present invention can be applied to an engine having two or more operation modes as the reduced-cylinder operation mode. For example, an operation mode of a six-cylinder engine may be realized such that it consists of an all-cylinder operation mode in which all of six cylinders are activated, and two reduced-cylinder operation modes: one mode in which two of the six cylinders are deactivated, and the remaining four cylinders are activated; and the other mode in which three of the six cylinders are deactivated, and the remaining three cylinders are activated.

In the case where the present invention is applied to such an engine having two or more operation modes as the reduced-cylinder operation mode, the vehicle control device may be configured to gradually ease the vehicle attitude control-starting (executing) condition and the vehicle attitude control-terminating condition, as the number of deactivatable cylinders becomes larger. That is, as the number of deactivatable cylinders becomes larger, the start threshold may be set to a smaller value, and the termination threshold may be set to a larger value. In addition, as the number of deactivatable cylinders becomes larger, the rate of change of the engine torque in the reduction direction may be set to a larger value, and the rate of change of the engine torque in the restoration direction may be set to a larger value. That is, as the number of deactivatable cylinders becomes larger, the additional deceleration correction value may be set to a larger value, and the additional deceleration correction value (deceleration reduction amount correction value) may be set to a larger value.

In the above embodiment, both of the easing of the vehicle attitude control-starting (executing) condition and the easing of the vehicle attitude control-terminating condition are performed. Alternatively, only the easing of the vehicle attitude control-terminating condition may be performed without performing the easing of the vehicle attitude control-starting condition. In the above embodiment, the rate of change of the engine torque in the reduction direction in the starting stage of the vehicle attitude control is set to a relatively large value, and further the rate of change of the engine torque in the restoration direction in the terminating stage of the vehicle attitude control is set to a relatively large value. However, the present invention is not limited to performing such settings.

In the above embodiment, the vehicle attitude control (torque reduction control) is executed based on the steering angle and the steering speed. Alternatively, the torque reduction control may be executed based on yaw rate or lateral acceleration, instead of the steering angle and the steering speed. Each of the steering angle, steering speed, yaw rate and lateral acceleration is one example of "steering angle-related value" as set forth in the appended claims.

LIST OF REFERENCE SIGNS 1 intake passage
2 (2A to 2D) cylinder
5 throttle valve
10 engine
13 fuel injector 14 spark plug
18 intake variable valve timing mechanism
20 valve stopping mechanism
30 accelerator position sensor
39 vehicle speed sensor
50 PCM
51 vehicle attitude control part
53 condition easing part
55 torque reduction rate-of-change setting part
57 torque restoration rate-of-change setting part
100 engine system

The invention claimed is:

1. A vehicle control device which is applied to a vehicle equipped with an engine, and an engine torque adjustment mechanism for adjusting an output torque of the engine, comprising:
 a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control; and
 a condition easing part configured to gradually ease the vehicle attitude control-terminating condition, as the number of times of combustion per unit time in the engine becomes smaller.

2. The vehicle control device according to claim 1,
 wherein the engine comprises a plurality of cylinders, and is capable of being operated in a reduced-cylinder operation mode in which combustion in a part of the plurality of cylinders is ceased, and
 wherein the condition easing part is configured to gradually ease the vehicle attitude control-terminating condition, as the number of cylinders in which combustion is ceased, among the plurality of cylinders, becomes larger.

3. The vehicle control device according to claim 1,
 wherein the vehicle is further equipped with an engine speed sensor configured to detect an engine speed of the engine, and
 wherein the condition easing part is configured to gradually ease the vehicle attitude control-terminating condition, as the engine speed becomes lower.

4. The vehicle control device according to claim 1,
 wherein the vehicle attitude control part is configured to control the engine torque adjustment mechanism such that a change rate of the output torque in a restoration direction becomes larger, as the number of times of combustion per unit time becomes smaller.

5. The vehicle control device according to claim 1,
 wherein the vehicle attitude control part is configured to control the engine torque adjustment mechanism such that an increase amount per unit time of the output torque at the time of a restoration becomes larger, as the number of times of combustion per unit time becomes smaller.

6. The vehicle control device according to claim 1,
 wherein the vehicle is further equipped with a steering angle sensor configured to detect the steering angle of the steering device,
 wherein the vehicle attitude control part uses, as the vehicle attitude control-terminating condition, such a condition that a change rate of the steering angle detected by the steering angle sensor is less than a given speed, and
 wherein the condition easing part is configured to ease the vehicle attitude control-terminating condition by increasing the given speed.

7. A vehicle control device which is applied to a vehicle equipped with an engine, and an engine torque adjustment mechanism for adjusting an output torque of the engine, comprising:
 a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control; and
 a condition easing part configured, when the number of times of combustion per unit time in the engine is a first value, to ease the vehicle attitude control-terminating condition more largely than when the number of times of combustion per unit time in the engine is a second value greater than the first value.

8. A vehicle control device which is applied to a vehicle equipped with an engine, and an engine torque adjustment mechanism for adjusting an output torque of the engine, comprising:
 a vehicle attitude control part configured, when such a condition that the vehicle is traveling and a steering angle-related value relevant to a steering angle of a steering device increases is satisfied, to control the engine torque adjustment mechanism to reduce the output torque of the engine to thereby execute a vehicle attitude control for generating a vehicle deceleration, and configured, when a given vehicle attitude control-terminating condition for terminating the vehicle attitude control is satisfied, to control the engine torque adjustment mechanism to restore the output torque of the engine to an original level of torque before the execution of the vehicle attitude control,
 wherein the engine comprises a plurality of cylinders, and is switchable between a reduced-cylinder operation mode in which combustion in a part of the plurality of cylinders is ceased, and an all-cylinder operation mode in which combustion is performed in all of the plurality of cylinders, and
 wherein the control device further comprises a condition easing part configured, when the engine is operated in the reduced-cylinder operation mode, to ease the vehicle attitude control-terminating condition more largely than when the engine is operated in the all-cylinder operation mode.

* * * * *